United States Patent
Kilpatrick et al.

(10) Patent No.: US 7,961,332 B2
(45) Date of Patent: Jun. 14, 2011

(54) FIBER-OPTIC HETERODYNE IMAGING VIBROMETER

(75) Inventors: James Munro Kilpatrick, Irvine, CA (US); Vladimir B. Markov, Irvine, CA (US)

(73) Assignee: MetroLaser, Inc., Irvine, CA (US)

( * ) Notice: Subject to any disclaimer, the term of this patent is extended or adjusted under 35 U.S.C. 154(b) by 322 days.

(21) Appl. No.: 12/134,935

(22) Filed: Jun. 6, 2008

(65) Prior Publication Data

US 2009/0046296 A1    Feb. 19, 2009

Related U.S. Application Data

(60) Provisional application No. 60/942,606, filed on Jun. 7, 2007.

(51) Int. Cl.
G01B 9/02 (2006.01)
G01B 11/02 (2006.01)

(52) U.S. Cl. .............................. 356/489; 356/502

(58) Field of Classification Search ............ 356/484, 356/489, 502
See application file for complete search history.

(56) References Cited

U.S. PATENT DOCUMENTS

| | | | | |
|---|---|---|---|---|
| 4,431,923 A * | 2/1984 | Wang et al. | | 250/491.1 |
| 5,153,669 A * | 10/1992 | DeGroot | | 356/489 |
| 5,907,404 A * | 5/1999 | Marron et al. | | 356/489 |
| 6,151,127 A * | 11/2000 | Kempe | | 356/484 |
| 6,381,023 B1 * | 4/2002 | Kempe | | 356/484 |
| 6,987,274 B1 * | 1/2006 | Street et al. | | 250/458.1 |
| 7,259,869 B2 * | 8/2007 | Hwang et al. | | 356/511 |
| 7,286,221 B2 * | 10/2007 | Caracci et al. | | 356/300 |
| 7,319,528 B2 * | 1/2008 | Hidaka | | 356/600 |
| 7,333,213 B2 * | 2/2008 | Kempe | | 356/489 |
| 7,364,296 B2 * | 4/2008 | Miller et al. | | 351/206 |
| 2006/0007448 A1 * | 1/2006 | Hwang et al. | | 356/512 |
| 2006/0058682 A1 * | 3/2006 | Miller et al. | | 600/476 |
| 2009/0046296 A1 * | 2/2009 | Kilpatrick et al. | | 356/484 |

\* cited by examiner

*Primary Examiner* — Patrick J Connolly
(74) *Attorney, Agent, or Firm* — Haynes and Boone, LLP (57) ABSTRACT

A method and system for performing two-dimensional laser Doppler vibrometry (LDV) are disclosed. A high speed fiber optic heterodyne imaging vibrometer can be used for the imaging of high speed surface deformation and/or vibration. Images provided by the high speed fiber optic heterodyne imaging vibrometer can be representative of movement, e.g., displacement or vibration, of the surface being imaged.

6 Claims, 5 Drawing Sheets

FIG. 8 ically dependent on the ability to acquire a reliable timing or reference signal from a point on the moving surface while the sequential measurements are in process in order to correctly synchronize and reconstruct the spatio-temporal phase of the surface motion. This is often implemented by attaching a load cell to the surface or by employing a secondary stationary point vibrometer.

FIBER-OPTIC HETERODYNE IMAGING VIBROMETER

PRIORITY CLAIM

This patent application claims the benefit of the priority date of U.S. provisional patent application Ser. No. 60/942,606, filed on Jun. 7, 2007 and entitled Fiber-Optic Heterodyne Imaging Vibrometer pursuant to 35 USC 119. The entire contents of this provisional patent application are hereby expressly incorporated by reference.

GOVERNMENT LICENSE RIGHTS

The U.S. Government has a paid-up license in this invention and the right in limited circumstances to require the patent owner to license others on reasonable terms as provided for by the terms of F09650-03-C-0027 awarded by the United State Air Force.

TECHNICAL FIELD

The present invention relates generally to optics. The present invention relates more particularly to a high speed fiber-optic heterodyne imaging vibrometer for the imaging of high speed surface deformation and/or vibration.

BACKGROUND

Measurement of full-field (two-dimensional), time-resolved structural vibration, can be accomplished using laser Doppler vibrometry (LDV) or high-speed electronic speckle pattern interferometry (ESPI), with full-field data compiled from two-dimensional spatial scanning (in the case of LDV) or temporal gating (in the case of ESPI) over multiple independent measurements. When correctly synchronized, the time history of a typical single surface motion can be synthesized or reconstructed from the multiple independent measurements. These approaches, however, assume that the measurement conditions remain invariant while multiple and, supposedly, identical, sequential measurements are performed, making this approach undesirably slow. These approaches are thus suited to steady-state or well characterized vibrations, generated under benign or controlled conditions.

These approaches are also critically dependent on the ability to acquire a reliable timing or reference signal from a point on the moving surface while the sequential measurements are in process in order to correctly synchronize and reconstruct the spatio-temporal phase of the surface motion. This is often implemented by attaching a load cell to the surface or by employing a secondary stationary point vibrometer.

Most engineering environments do not satisfy these requirements. In routine tests, natural or forced excitation can give rise to steady state and/or non-steady state vibrations which can include transients, e.g. from impact, or coupled vibrations, generated under test conditions which may be difficult, or impractical, to reproduce consistently or repeatedly.

Reports in the scientific and patent literature cite the development of linear array multiple-beam laser vibrometers aimed primarily at reducing measurement times with respect to single beam scanning LDV. Existing instruments include linear arrays with up to 16 independent channels, which, together with opto-mechanical rotation or linear translation, can yield full-field data with concomitantly fewer sequential measurements.

Examples of such contemporary multiple-beam laser vibrometers are disclosed in United Kingdom patent GB 2372097A, entitled "MULTIPLE BEAM INTERFEROMETER", issued in 2002, and in U.S. Pat. No. 7,116,426, issued on Oct. 3, 2006, entitled "MULTI-BEAM HETERODYNE LASER DOPPLER VIBROMETER".

Both homodyne and heterodyne LDV systems based on single-point and linear array measurement techniques, as discussed above, have been extensively investigated. Such devices form the basis of various conventional commercial instruments. However, such devices do not provide adequate two-dimensional information for many practical applications because of the inherent data latency associated with opto-mechanical scanning of the beam(s) over the measurement surface. This approach is not capable of real-time vibration imaging, but is capable of synthesizing vibration images for a restrictive subset of well behaved surface vibrations.

Full-field or imaging vibrometry is also claimed using the method of high-speed electronic speckle pattern interferometry. Examples of contemporary high-speed electronic speckle pattern vibrometers are disclosed in U.S. Pat. No. 7,193,720, entitled "OPTICAL VIBRATION IMAGER" issued on Mar. 20, 2007. However, as is well known, the temporal bandwidth of the proposed (commercial) camera detector arrays are insufficient to support real time vibration imaging. Future developments are conjectured to address this limitation. Assuming such developments do follow, the adoption of CCD or CMOS pixel camera technology in full-field heterodyne vibrometry must still address the noise associated with DC detector bias, which become progressively more severe with increasing bandwidth.

BRIEF SUMMARY

A method and system for performing real-time heterodyne imaging (two-dimensional) laser vibrometry are disclosed. More particularly, a high speed fiber-optic heterodyne imaging vibrometer can be used to image dynamic two-dimensional surface motion in real time. The method is accordingly applicable to a broad range of complex surface vibration phenomenon which have previously not been amenable to experimental study with LDV or ESPI.

According to one or more embodiments, a dual-function optic (DFO) can comprise a front focal point and a rear focal plane. The dual-function optic can be configured to collimate a single reference beam that diverges from its front focal point while simultaneously focusing a plurality of signal beams at its rear focal plane.

According to one or more embodiments, a side-launch beam combiner can comprise an optical transmission element configured to provide a diverging beam. The beam can diverge from proximate a center of the optical transmission element and can propagate in a direction approximately normal to a surface of the optical transmission element. The optical transmission element can be substantially transmissive to light passing therethrough.

According to one or more embodiments, a multi-beam interferometer can comprise an array of discrete illuminating beam sources and an imager for imaging and optically mixing light from the discrete illuminating beam sources with a single flood-illuminated reference beam.

According to one or more embodiments, an integrated fiber-optic laser vibrometer can comprise an interferometer, a plurality of laser light sources providing light to the interferometer, a beam splitter defining illumination and reference beams, a reference beam modulation for modulating the reference beam, a beam launcher for launching the reference beam, an optical signal collection and detector array coupling for collecting and detecting the illumination beams and the reference beam. The vibrometer utilizes all fiber component technology.

According to one or more embodiments, a modular detector array can comprise a high-speed a detector coupled by a high density multi-fiber transmission cable to a remote two-dimensional fiber optic focal plane array.

According to one or more embodiments, a matrix laser vibrometer can comprise a laser source configured to simultaneously generate and project a two-dimensional array of laser beams to a remote extended structure to facilitate full-field measurement of a dynamic spatial distribution of surface velocity or dynamic vibrational pattern of the illuminated structure.

According to one or more embodiments, a method for providing real-time full-filed capture of surface velocity and vibration profiles can comprise capturing the profiles without moving the measurement beam(s).

Benefits include the two-dimensional imaging of the movement, e.g., displacement, velocity and/or vibration, of a surface such as by using a compact remote inspection probe that facilitates rapid manipulation and translation over convoluted or extended surfaces. The use of such an inspection probe can facilitate structural monitoring and/or use for non-destructive inspection (NDI) applications.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Laser Doppler vibrometry (LDV) devices using a single beam and a beam scanning system are known. Scanned single-beam techniques are suitable for measuring vibrations that are repetitive, e.g., continuously cycling at the same location. However, because the measurements are made sequentially from one location to the next, the value of this technique is limited.

Since long data acquisition cycles are required to collect two-dimensional spatially distributed data the process can incur measurement errors due to variable environmental conditions. In addition, a separate phase reference signal is essential to correctly reconstruct the two-dimensional data field from sequentially sampled data. This typically requires the physical attachment of an accelerometer cell to the surface in question or the use of a secondary fixed reference vibrometer.

A plurality of single-beam LDV systems can be used to measure multiple locations on an object to rapidly provide two-dimensional information. However, this solution can be undesirably costly. This solution can also be too complex if a large number of simultaneous measurements are required, e.g., 256.

As those skilled in the art will appreciate, the simultaneous measurement of surface velocity on a two dimensional grid is required in order to gain a complete insight into an object's vibrational characteristics. More particularly, such simultaneous measurements provide phase information which depicts the two-dimensional flow of mechanical energy within the structure and a potential diagnostic indicator for identification of propagation mechanisms and sound generation.

The measurement of non-repetitive vibrations is important when analyzing many everyday engineering structures. For example, the measurement of non-repetitive and transient vibrations can be important for civil structures, aerospace composite components, rotating machinery, impact and damage testing, rotor disk brake interaction, as well as for non-destructive inspection.

Thus, it is desirable to provide a laser vibrometer that is capable of high speed measurement of surface velocity or vibration in two dimensions (imaging), with a high signal-to-noise ratio, wide dynamic range, and high accuracy, while operating under a less restrictive range of conditions such that it is sufficiently robust for field use. It is further desirable to provide a laser vibrometer having a lightweight and compact remote inspection probe that facilitates rapid manipulation and translation over convoluted or extended surfaces for structural monitoring and NDI applications.

A method and system for the two dimensional imaging of the surface velocity distribution and/or vibration of a surface are disclosed. According to one or more embodiments, a device comprises a two dimensional heterodyne-imaging laser vibrometer. The device bridges an existing gap between conventional electronic speckle pattern interferometers (ESPI) and scanning laser Doppler vibrometers (SLDV). The device can combine the two dimensional (spatial) imaging capability of ESPI with the high bandwidth (temporal) performance of LDV so as to provide full-field real-time vibration imaging.

In addition to supporting high-speed, real-time vibration imaging, one or more embodiments can open to further study an important class of vibration phenomenon comprising random, non-repeatable or transient vibrations that frequently arise in industrial vibration diagnostics and non-destructive inspection (NDI), but which have remained largely beyond the measurement capabilities of current technology. One or more embodiments can be applicable to materials non-destructive inspection (NDI), as well as a much broader range of structural vibration monitoring tasks.

As mentioned above, contemporary methods and devices for facilitating heterodyne vibration imaging of high speed surface velocity or vibration are only operable under restrictive experimental conditions due to data latency problems arising from the low temporal bandwidth of available two dimensional array detectors. However, according to one or more embodiments of the present invention, the two dimensional (image) data is acquired simultaneously and in two dimensions.

This data acquisition can be performed at frame rates much higher than most vibrations of practical interest, e.g., 0.625 MHz. The use of such data acquisition rates can facilitate the measurement of a more complete temporal evolution history of the surface motion of a surface irrespective of the precise nature of such motion. Thus, the present invention can be used to image random, transient, periodic, and non-stationary vibrations.

Embodiments of the invention can comprise telecommunications fiber-optic components and technology as an integral part of the interferometer and system design. The use of such telecommunications fiber-optic components and technology support the development of robust field instrumentation comprising an extremely compact remote inspection probe that uses a fiber-optic link to the data acquisition and processing module. The miniaturization of the inspection probe is intended to facilitate rapid manipulation and translation over convoluted or extended surfaces for structural monitoring and NDI applications.

Although attempts have been made to mitigate problems with contemporary laser Doppler vibrometers, as discussed above, such attempts do not provide a satisfactory remedy. For example, in a contemporary laser Doppler vibrometer the data latency problem is primarily due to the use of long one dimensional or two dimensional image scanning times in the case of SLDV, and by the slow frame readout rate in the case of ESPI.

The problem of data latency has given rise to a number of techniques which effectively involve image synthesis from multiple experiments. Full field vibration data acquisition has therefore been limited to snap-shots of high speed events or, alternatively, to low vibration frequencies (<1.0 kHz), in the case of high-speed ESPI, or to synthesized two dimensional images obtained from multiple repeated measurements, based on certain simplifying assumptions about the repeatability of the surface motion under study, in the case of SLDV.

Contemporary methods described as high speed ESPI or high speed digital holography have attempted to address the problem of real-time full-field measurement of surface vibration (displacement or velocity) by employing specialized high speed CCD or CMOS camera detectors. By comparison with one or more embodiments, these approaches are not well suited to this application and, in particular to field application due to a number of specific deficiencies as discussed below.

Because of the high pixel density of CCD or CMOS detectors, and limited space-bandwidth capabilities, these approaches still lack the very short framing rates (<10 microseconds) required to adequately measure the full range of structural vibrations of practical industrial interest (1-20 kHz). Practical demonstrations of such methods are therefore typically restricted to the low frequency vibration regime (<1.0 kHz).

The acquired image data is consequently biased toward very high spatial resolution and low temporal resolution, leading to several further undesirable consequences. In particular, for application to structural modal analysis, much of the spatial data acquired by charge coupled device (CCD) or complimentary metal oxide semiconductor (CMOS) arrays is redundant in comparison to the minimum spatial sampling required to adequately characterize the spatial vibration modes of interest.

Phase demodulation procedures required to convert the measured intensity images into phase (displacement) or phase derivative images (velocity) must necessarily be based on spatial phase unwrapping which is widely recognized as a complex, slow procedure, prone to the production of phase images with high noise levels.

Slow framing rates leave these methods susceptible to errors from environmental disturbance during the acquisition cycle in the case of temporal phase stepping approaches where, typically, a minimum of four intensity images are required to recover one phase image. This problem can be avoided by spatial phase stepping configurations where multiple intensity images are acquired simultaneously using multiple detectors or by spatial multiplexing schemes on single array detectors. This approach however is inherently more complex and expensive and does not ultimately address the important temporal frame rate problem for real-time vibration imaging, providing instead a snap-shot view of a dynamic motion.

The adoption of CCD and CMOS detectors in high-speed heterodyne vibrometers incurs increasing 1/f detector noise levels attributed to the DC biased pixel detector as the operating bandwidth is extended to higher frequency. In the custom MLV array, by comparison, the detector output is AC coupled and bandpass filtered around the preferred FM carrier frequency.

Very high speed CCD or CMOS cameras are typically expensive, bulky and consequently ill-suited to field instrumentation. The Kodak HS4540 for example, which has been employed in this application, having a frame time of 25 microseconds with selectable sub array region of interest (ROI) comprising 64×64 pixels.

ESPI methods typically employ flood illumination of the measurement surface, which, while necessary for high density pixel array detectors, nonetheless requires high power laser systems to achieve adequate area illumination and signal to noise, frequently necessitating application of reflective coatings to the test structure.

Neither ESPI nor SLDV can provide real-time or true two dimensional vibration imaging over the full audio acoustic spectrum of practical industrial interest (0.1-20 kHz). The MLV however bridges a gap between conventional electronic speckle pattern interferometers (ESPI) and scanning laser Doppler vibrometers (SLDV) combining the two dimensional (spatial) imaging capability of ESPI with the high bandwidth (temporal) performance of LDV for full-field vibration imaging.

One or more embodiments can provide real-time or true two dimensional vibration imaging well beyond the full audio acoustic spectrum of practical industrial interest (0.1-20 kHz) by, in effect, eliminating some of the redundant spatial bandwidth capacity of ESPI. This represents a desired solution for structural vibration applications as compared to, for example, conventional high resolution imaging, and can be done in favor of the higher temporal bandwidth required to support real-time vibration imaging.

Embodiments of the present invention further combine a fixed-staring, discrete two dimensional point matrix illumination scheme, more typical of the grid point measurement array employed in sequentially scanned LDV, with a fiber-guided flood-illuminated local oscillator, more commonly found in ESPI. This selective combination affords a hybrid scheme which is both optically efficient and extremely robust with respect to alignment in adverse field environments.

In addition to supporting real-time vibration imaging, the invention opens to further study an important class of vibration phenomenon comprising random, non-repeatable, transient and non-stationary vibrations which frequently arise in industrial NDI but which have remained largely beyond the measurement capabilities of current technology.

Advantages of the staring array (non-scanning) approach employed in one or more embodiments of the matrix laser vibrometer with respect to scanning LDV, for example, include enhanced inspection speed and data integrity as the provision of two-dimensional spatial data that is acquired instantaneously with no scanning or image synthesis.

These advantages result in faster data collection for large area NDI, optimum immunity to variable measurement conditions in the field, and thus mitigates solid body motion or pointing errors that affect data integrity and registration in synthesis of scanned LDV images.

Embodiments of the present invention further support the ability to characterize transient, non-repeatable and/or non-periodic vibrations such as those that are frequently encountered in failure mechanics involving destructive or fatigue testing of components, in acoustic emission phenomenon, or in mechanical systems subject to random forcing functions which generate non-stationary modes. In such cases, the requirement for a two-dimensional, spatially-distributed measurement is essential. Currently, such applications must employ two-dimensional accelerometer arrays fixed to the test structure. This approach is lengthy due to electrical wire routing and sensor setup and dismantling times and, in addition, imposes mechanical loading of the structure under test which can invalidate the data.

Vibration phase information provides a key indicator depicting the flow of mechanical energy between sources and sinks in mechanical systems subject to vibrational stimulus. This key indicator can define the vector direction of the predominant force responsible for structural vibration and a potential basis for vibration diagnostics and, therefore, a potential aid in identification of noise generation mechanisms and active control (suppression) methods.

One or more embodiments can utilize an extremely simple and robust optical design in conjunction with a simple temporal phase recovery data processing scheme, as discussed herein. These features support future development of the invention as a compact, robust and potentially low cost solution for development of field instrumentation for industrial NDI.

One or more embodiments can comprise at least some of the design features commonly found in electronic speckle pattern interferometers. However, unlike conventional ESPI instruments, one or more embodiments can be configured such that inspection surface is not flood illuminated with laser light. Rather, the inspection surface can be illuminated by a high density two dimensional array of focused laser beams, such as those that are generated from a diffractive optical element.

The use of a high density two dimensional array of focused laser beams enhances light efficiency and is thus suited to measurements on uncooperative (low reflective) surfaces. As those skilled in the art will appreciate, such uncooperative surfaces are commonly found in industrial inspection environments.

At least some embodiments do not utilize low frame rate commercial charge coupled device (CCD) or complimentary metal oxide semiconductor (CMOS) detectors. Further, such embodiments do not require expensive CCD detectors with higher frame rates such as those used in ESPI.

Each channel in the array can have a dedicated high speed receiver which facilitates parallel, high-speed readout of the entire array. The frame readout rate can be 0.625 MHz and can be limited by the speed of available A-to-D converters.

One or more embodiments can function as a real-time imaging laser vibrometer array. Unlike contemporary LDV instruments, embodiments of the present invention can have a high density (16×16 or greater) staring beam array to acquire dynamic two dimensional images depicting the temporal evolution of surface motion.

One or more embodiments can comprise a single collimated local oscillator (reference) beam which flood illuminates all channels in the detector focal plane, avoiding the requirement for a critically matched identical local oscillator array as employed in linear multichannel LDV designs reported to date as discussed above, wherein the mechanical tolerances associated with spatial overlapping of the separate matched focused beam arrays can prove a limitation for field applications.

One or more embodiments can be implemented at visible laser wavelengths such as 633 nm (red) or 532 nm (green), however, several immediate operational advantages follow from operation at 1550 nm rather than visible wavelengths. For example, Class 1 eyesafe designation permits 10 mW per beam compared to only 1 mW per beam for visible wavelengths. Also, detection bandwidths, being in inverse proportion to wavelength, are reduced by a factor of approximately 3 at 1550 nm compared to 532 nm.

Further, a wide variety of fiber-optic components, designed for operation at 1550 nm, have been adapted in a highly efficient, flexible and compact optical design for high density heterodyne imaging vibrometer, which is implemented in a practical field instrument. The availability of compact fiber-optic lasers, for example, provide a narrow line width and high power efficient laser source in a compact module which is remotely supplied (such as by fiber-optic link) to the matrix laser vibrometer probe of one or more embodiments.

These features have important beneficial implications for the matrix laser vibrometer system specifications. For example, failure to satisfy the conditions for class 1 eyesafe operation can prove limiting with regard to the use of laser instruments in unrestricted areas and impose additional regulatory conditions on their use. Due to the reduced damage sensitivity of the eye to wavelengths in the 1550 nm region, higher permissible exposure limits apply, with up to 10 mW at 1550 nm qualifying as class I eyesafe, meaning the device is viewable under all conditions with no risk of eye injury. This permits higher transmission power levels and hence better measurement signal-to-noise ratio) SNR without direct risk to operating personnel or bystanders.

One or more embodiments of the matrix laser vibrometer can comprise fiber-optic component technologies making them hybrids (fiber/bulk optic) digital heterodyne matrix vibrometers employing 1.5 micron wavelength telecommunications hardware with discrete transmitted beam array together with single flood illuminated local oscillator.

One or more embodiments of the matrix laser vibrometer can comprise a compact high power narrow line width 1550 nm fiber laser integrated in a system electronics unit with laser light conveyed by fiber-optic link to a compact remote inspection probe.

According to one or more embodiments, the inspection probe can comprises a simple and robust common path optical configuration with dual function telecentric imaging lens. The telecentric imaging lens can be used to both collimate the reference beam and to simultaneously focus signal beam array.

According to one or more embodiments, a side launched local oscillator beam can be implemented by microprism terminated fiber or preferably micromachined fiber tip comprising 45 degree polished fiber with aluminum mirrored hypotenuse. The uniform profile ($TEM_{00}$) local oscillator so generated can be collimated by a telecentric lens placed substantially one focal length from the microprism. The collimated beam which flood-fills the receiver microlens array, eliminates the requirement for a second beam splitting cube and collimating telescope as found in typical Mach-Zehnder interferometer.

According to one or more embodiments, beam heterodyning can be achieved by serrodyne phase modulation of the beam guided by a fiber pigtailed lithium niobate waveguide phase modulator. This device provides a highly compact and efficient method of beam heterodyning compared to existing methods employing (often dual) Bragg cells or moving mirrors.

The waveguide modulator is a key component of the integrated fiber-optic system design, and exhibits high electrical efficiency since it is only necessary to modify the optical index of the narrow waveguide region through which the optical signal is guided. Waveguide phase modulators are widely employed in telecommunications but have not been widely reported for beam heterodyning.

According to one or more embodiments, a modular two dimensional indium gallium arsenide (InGaAs) detector array employs a microlens array coupled to two dimensional fiber matrix collector with an arbitrary length fiber-optic link to a distributed array of fiber-pigtailed InGaAs detectors and custom receiver array electronics.

One or more embodiments of the matrix laser vibrometer can incorporate a highly parallel multi-processor architecture for high speed demodulation of the matrix laser vibrometer data stream to generate vibration images in real time. Alternative embodiments may incorporate dedicated digital signal processing hardware or multiple field programmable gate arrays (FPGA) processors.

Figure 1:
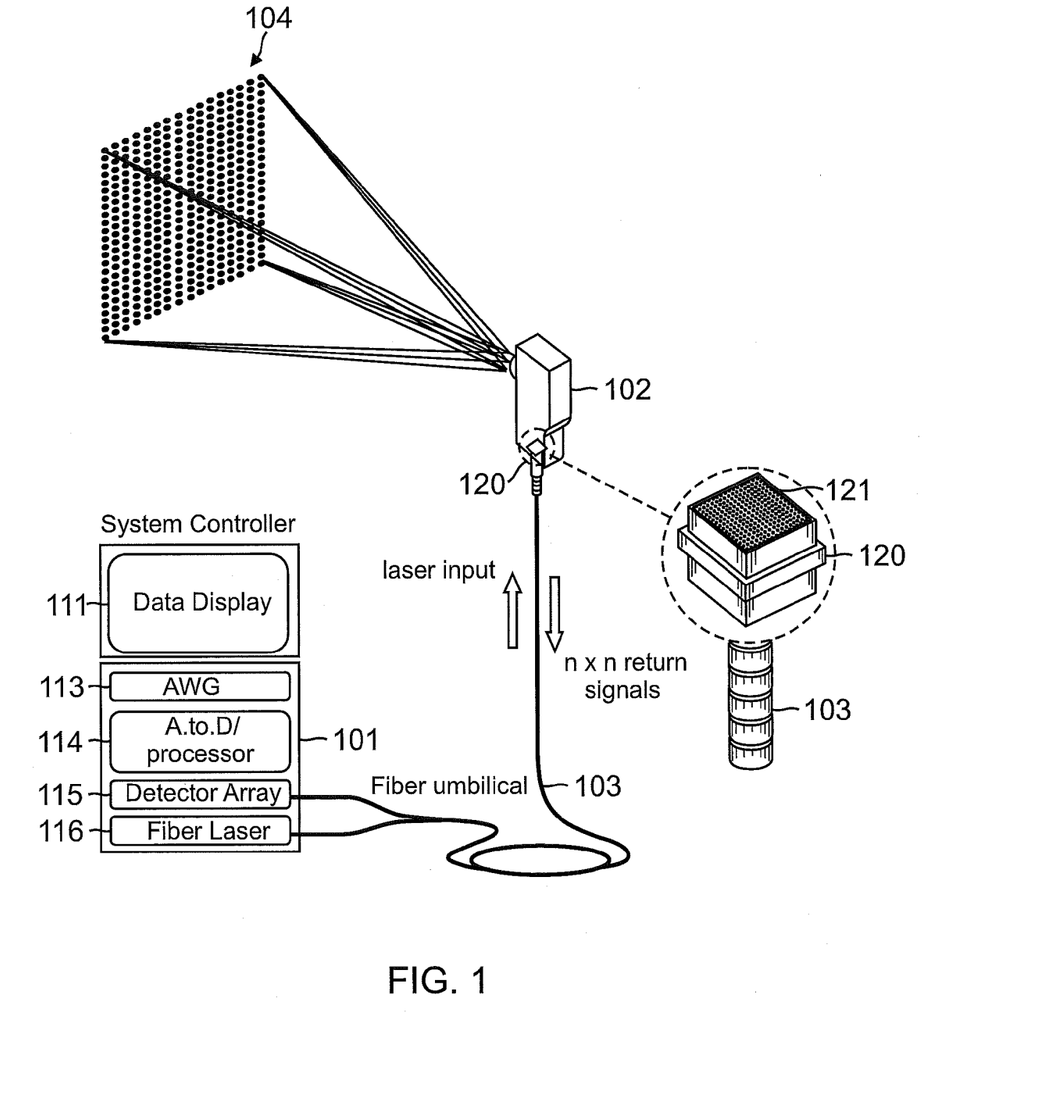
FIG. 1 is a semi-schematic perspective view of a fiber-optic heterodyne imaging vibrometer suitable for use in single frame measurement or inspection, according to an exemplary embodiment of the present invention.

Referring now to FIG. 1, a high speed fiber-optic heterodyne imaging vibrometer system can be configured for use in single frame inspection and measurement. A probe of the vibrometer system can be hand held or otherwise positioned so as to facilitate inspection or measurement of one frame. The probe can be re-positioned, such as by hand, so as to facilitate the inspection or measurement of a plurality of frames.

Figure 6:
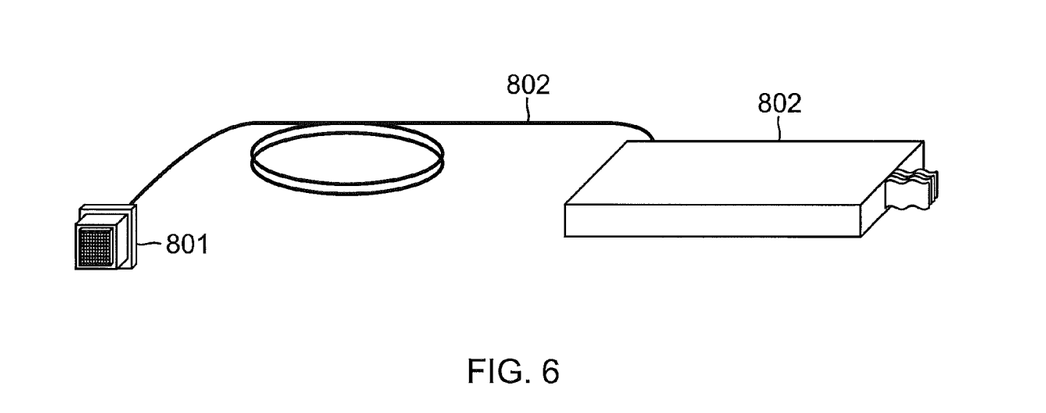
FIG. 6 is a semi-schematic view showing the architecture of a customized detector array comprising a passive fiber-optic focal plane array linked by a plurality of fiber-optic ribbons to a remote electronic receiver array, according to an exemplary embodiment of the present invention.

The vibrometer system can comprise a system controller 101 that communicates with a matrix laser vibrometer probe 102, such as via one or more fiber-optic cables 103. The matrix laser vibrometer probe 102 can be stationary or can be moved across the surface of a test structure 104. The laser vibrometer probe 102 can be mover across the surface of the test structure104 by hand or by using a motorized XY rail 105 (FIG. 6). Those skilled in the art will appreciate that other means for positioning the matrix laser vibrometer probe 102 are likewise suitable.

The system controller 101 can comprise a display 111, an arbitrary waveform generator (AWG) 113, an A-to-D processor 114, detectors 115, and a fiber laser 116. The laser 116 provides a laser output, via fiber-optic cables 103, to the matrix laser vibrometer probe 102. The detectors 115 convert light returned from the matrix laser vibrometer probe 102 via fiber-optic cables 103 into analog electronic signals representative thereof. The A-to-D converter and processor 114 converts the analog electronic signals into demodulated base band I and Q (in-phase and quadrature) signals from which the surface velocity may be determined by various well known algorithms familiar to those versed in FM communication principles. The controller 112 controls the operation of the display 111, AWG 113, A-to-D processor 114, detectors 115, laser 116, and the matrix laser vibrometer probe 102.

A focal plane coupler 120 has a microlens/fiber array 121, as discussed below. For applications requiring active stimulus, an acoustic probe 106 (FIG. 6) can provide acoustic energy to excite the test surface 104. The acoustic probe can be mounted upon an extension 107 so as to place a transducer of the acoustic probe proximate the test surface 104 during the imaging process.

Figure 2:
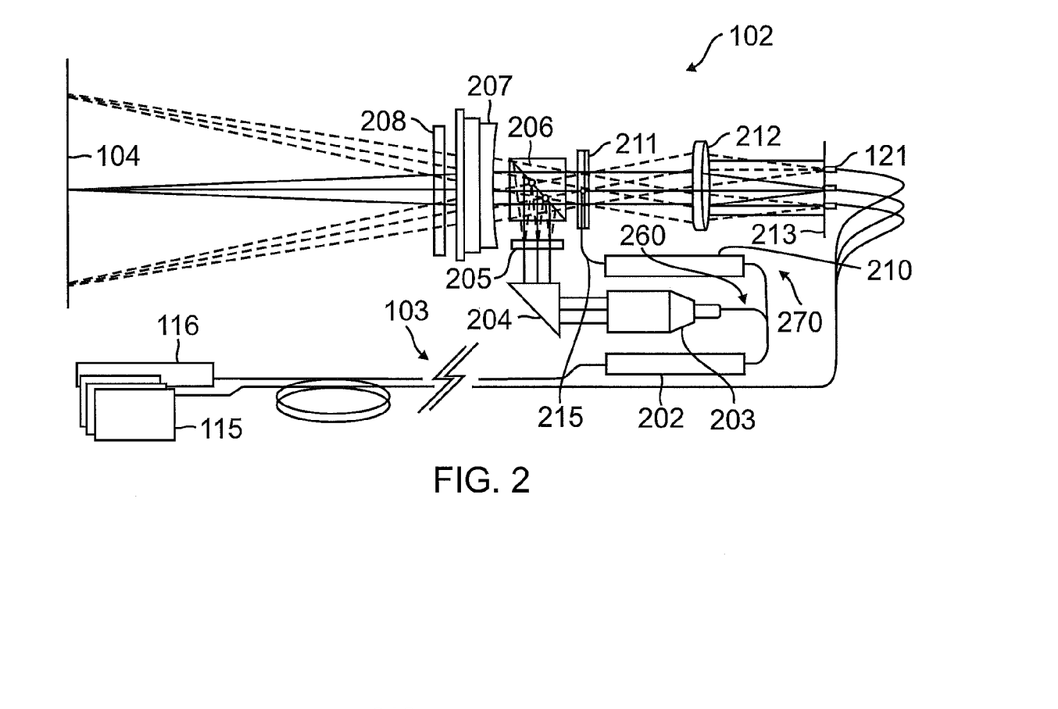
FIG. 2 is a semi-schematic side view showing the internal optical detail of a matrix laser vibrometer (MLV) measurement probe, according to an exemplary embodiment of the present invention.

Referring now to FIG. 2, the matrix laser vibrometer probe 102 receives light from laser 116 via fiber-optic cables 103 as discussed above. The matrix laser vibrometer probe 102 can comprise an optic coupler/splitter 202, a fiber pigtailed collimating telescope 203, a prism 204, a diffractive optical element (DOE) 205, a polarizing beamsplitter 206, an F-theta objective lens 207, a quarter wave plate 208, a phase modulator 210, a side-launch combiner 211, a telecentric/collimator lens 212, a microlens array 121, and a photodiode array defining detectors 115.

Light from the laser 116 at 1550 nm wavelength, for example, can be guided via fiber-optic cables 103 to the matrix laser vibrometer probe 102. Fiber-optic cables 103 can optionally be disposed within an armored lead.

Within the matrix laser vibrometer probe 102, the light from laser 116 enters polarization maintaining (PM) fiber splitter 202. The incoming light is split by PM fiber splitter 202 into the two output circuits in which the splitting ratio can be between approximately 50/50 and approximately 80/20. The two resulting light circuits define a signal arm 260 and a reference arm 270 of an interferometer.

The signal arm output of fiber splitter 202 continues on to a fiber pigtailed collimating telescope 203, where it exits the fiber and is launched into free space as a collimated beam of 8-12 mm diameter. Meanwhile, the reference arm output of the fiber splitter 202 is conveyed via a continuous fiber circuit into a waveguide phase modulator, such as lithium niobate waveguide phase modulator 210. The waveguide phase modulator 210 can be an APE type of waveguide phase modulator. However, as those skilled in the art will appreciate, other types of waveguide phase modulators are also suitable. For example, the waveguide phase modulator can alternatively be a TI type of waveguide phase modulator.

The frequency modulated output from the waveguide phase modulator 210 can be launched on-axis into the interferometer via a side-launch combiner 11 that is configured to emit the light from the waveguide phase modulator 210 at an angle of approximately 90 degrees with respect to the fiber axis.

Figure 3:
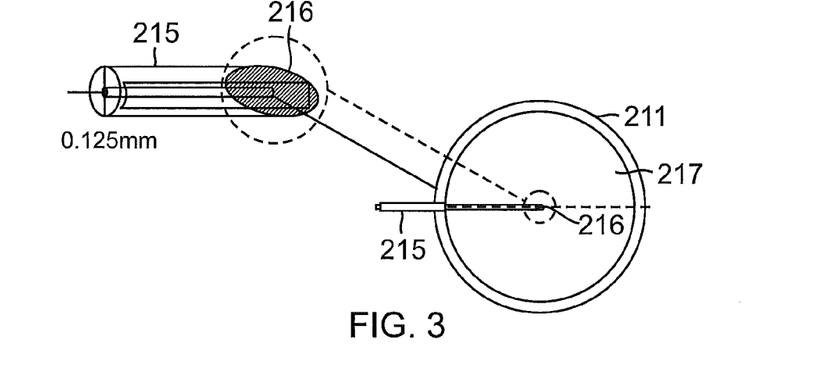
FIG. 3 is a semi-schematic drawing showing a side launch 45 degree angle polished fiber recombiner and also showing a fiber centered and mounted on an optical window, according to an exemplary embodiment of the present invention.
Figure 4:
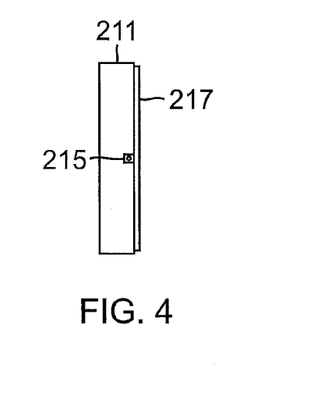
FIG. 4 is a semi-schematic side view of the fiber and optical window of FIG. 4.

Referring now to FIGS. 3 and 4, emitting the light from waveguide phase modulator 210 (FIG. 2) at an angle of approximately 90 degrees can be achieved by terminating the fiber 215 with a 45 degree angle polish and applying a metallic or dielectric reflective coating 216. The side launch fiber can then fixed by epoxy or other means to a piano-parallel optical window 217 and aligned so as to launch a diverging beam along the optical axis. The side-launch mechanism can be configured so as to tend to minimize obstruction of the pupil aperture.

Figure 5:
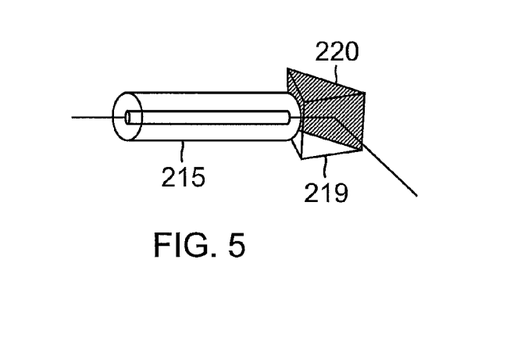
FIG. 5 is a semi-schematic drawing showing a side launch recombiner having a right angle microprism, according to an exemplary embodiment of the present invention.

Referring now to FIG. 5, a microprism 219 having a mirrored surface 220 can be used instead of the 45 degree angle polish and reflective coating 216 of FIG. 4. The microprism can be affixed to the fiber tip of the fiber 215.

The diverging beam from the side launch fiber can be collimated by a telecentric/collimator lens 212. The collimated beam from the telecentric/collimator lens 212 "flood" illuminates the focal plane area and defines a local oscillator or reference beam of the interferometer. A collimated local oscillator can be introduced via a second non-polarizing beam splitter located between the telecentric lens and the focal plane. The side launch scheme however, permits a simpler design for the probe assembly, is more optically efficient with respect to the reference illumination and, as a common path configuration, provides a more robust design.

In the signal arm, the output beam from the telecentric/collimator lens 212 is folded by a right angled prism 204 and is normally incident on a diffractive optical element 205. The diffractive element generates a two dimensional array of collimated beams which diverge from the illuminating beam at a fixed inter-beam angle. The two dimensional array can be a 16×16 element array, for example.

The diverging beams can be folded by the polarizing beam splitter 206 and can be transmitted via f-theta objective lens 207 and quarter wave plate 208 where the beams are brought to focus in a two dimensional matrix upon the object plane or surface of the test structure 104. It is the surface of the test structure that is being characterized by the present inventions so as to determine the dynamic deformation or vibration thereof.

The light scattered (reflected) by the surface 104 which lies within the collection aperture of the f-theta objective lens 207 passes back through the quarter wave plate 205 and the f-theta objective lens 207. Being orthogonally polarized by the dual passage through the quarter wave plate, the collected light is now transmitted by the polarizing beam splitter 206 and the matrix is re-imaged by the telecentric/collimator lens 212 in the back focal plane 213 of the interferometer.

At the back focal plane 213, the focused signal beam array is overlapped by the modulated collimated local oscillator beam and both are coupled by a two dimensional microlens array into a matching discrete two dimensional fiber array 121 (also shown in FIG. 1). The individual fibers or channels of the array form a bundle which serves as an optical conduit carrying the signals to the remote modular detector array 115.

The amplified electrical signals may be subject to further filtering or signal conditioning before being fed to a local (on-board) microprocessor where the N channel signals are digitally demodulated by one of several suitable algorithms such as digital I and Q or N-step phase demodulation algorithms. N-point phase demodulation algorithms provide an optional fast software signal demodulation procedure, applicable to a system in which the data sampling is synchronised with the phase modulation. In the preferred scheme this synchronization is controlled from a separate multichannel waveform generator board whose outputs drive the phase modulator, provide timing signals for the analog-to-digital convertors, transducer drive signals (e.g. piezo, acoustic), and any further triggering signals required to synchronize operation to external events. The proposed multi-processor architecture employing dedicated local data processing distributed over multiple microprocessors (one per detector board) provides a substantial reduction in the data traffic which would otherwise have to pass from the multichannel A-to-D to a central processor via the main computer bus system, resulting in potential bottlenecks due to data buffer limitations.

All of the necessary functions, detection, A-to-D, and processing are preferable integrated in the detector/processor board which accepts N-channel fiber-optic input connectors and outputs N-channel processed velocity and displacement signals to the computer bus system. The processed array data may then be shown on display 111 as velocity or displacement images. Further processing, e.g., frequency response, modal analysis, N.D.I. feature extraction and analysis, can be performed, as is appropriate to the application.

Referring now to FIG. 6, the focal plan 213 of FIG. 2 can be replace with an imaging detector 801, e.g., a camera. The imaging detector can provide signals representative of the interfering reference beam and the individual measurement beams via cable 802 to detector electronics 802. Detector electronics 802 comprises the circuitry required to operate the imaging detector 801 and can provide electrical signals representative of the output of the imaging detector 801 to system controller 101 (FIG. 1).

Figure 7:
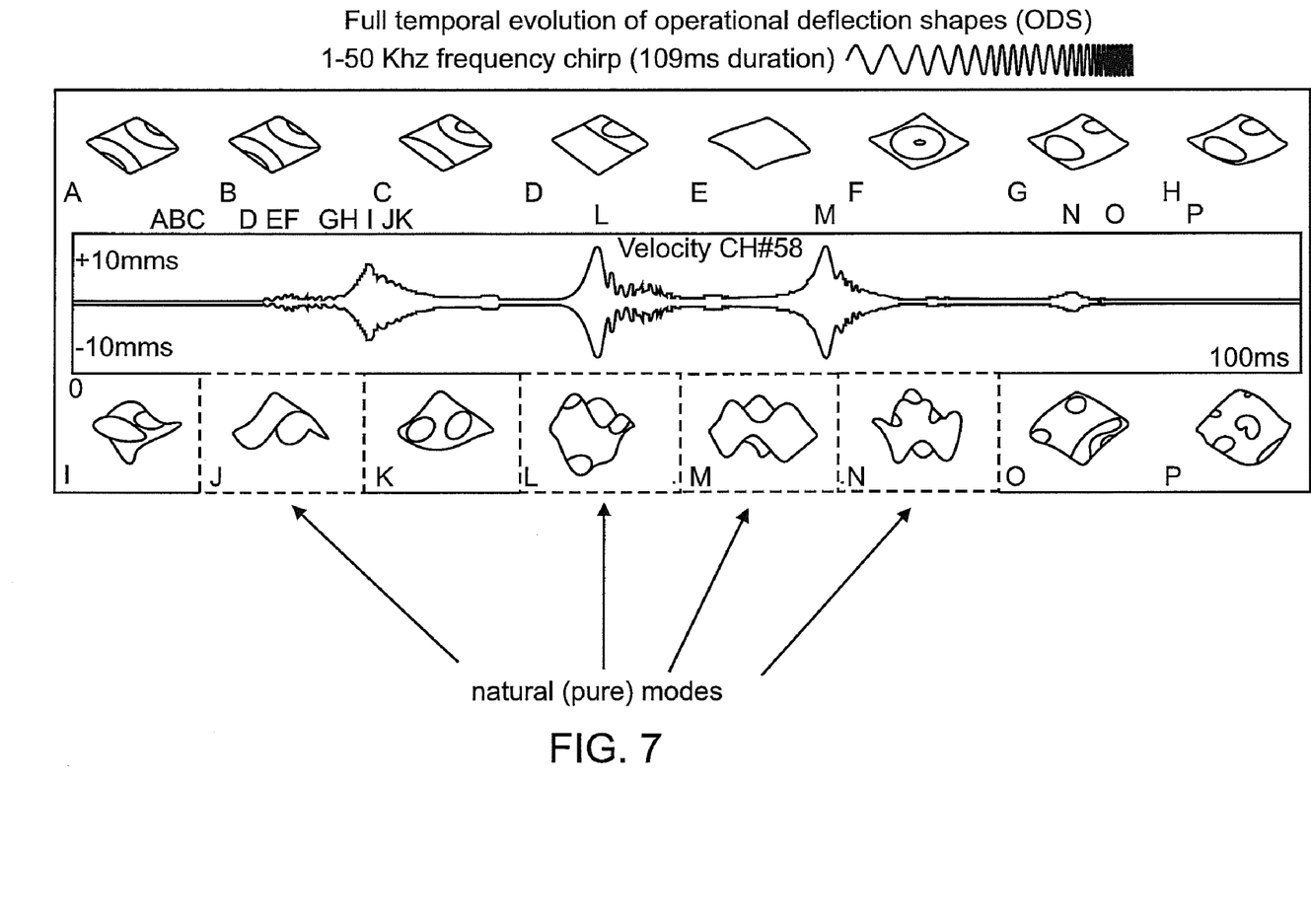
FIG. 7 is time history showing the vibration of a surface and also showing several vibrational modes of the surface.

Referring now to FIG. 7, a sample of the evolution of deflection shapes, e.g., vibrational modes, that can be determined by the vibrometer system is shown. Frames A-P show different deflection shapes. The position along the time history where these deflection shapes occur is labeled A-P on the time history. For example, the deflection shape of frame A occurs at point A of the time history. One or more embodiments of the imaging vibrometer can provide such images in substantially real time.

Figure 8:
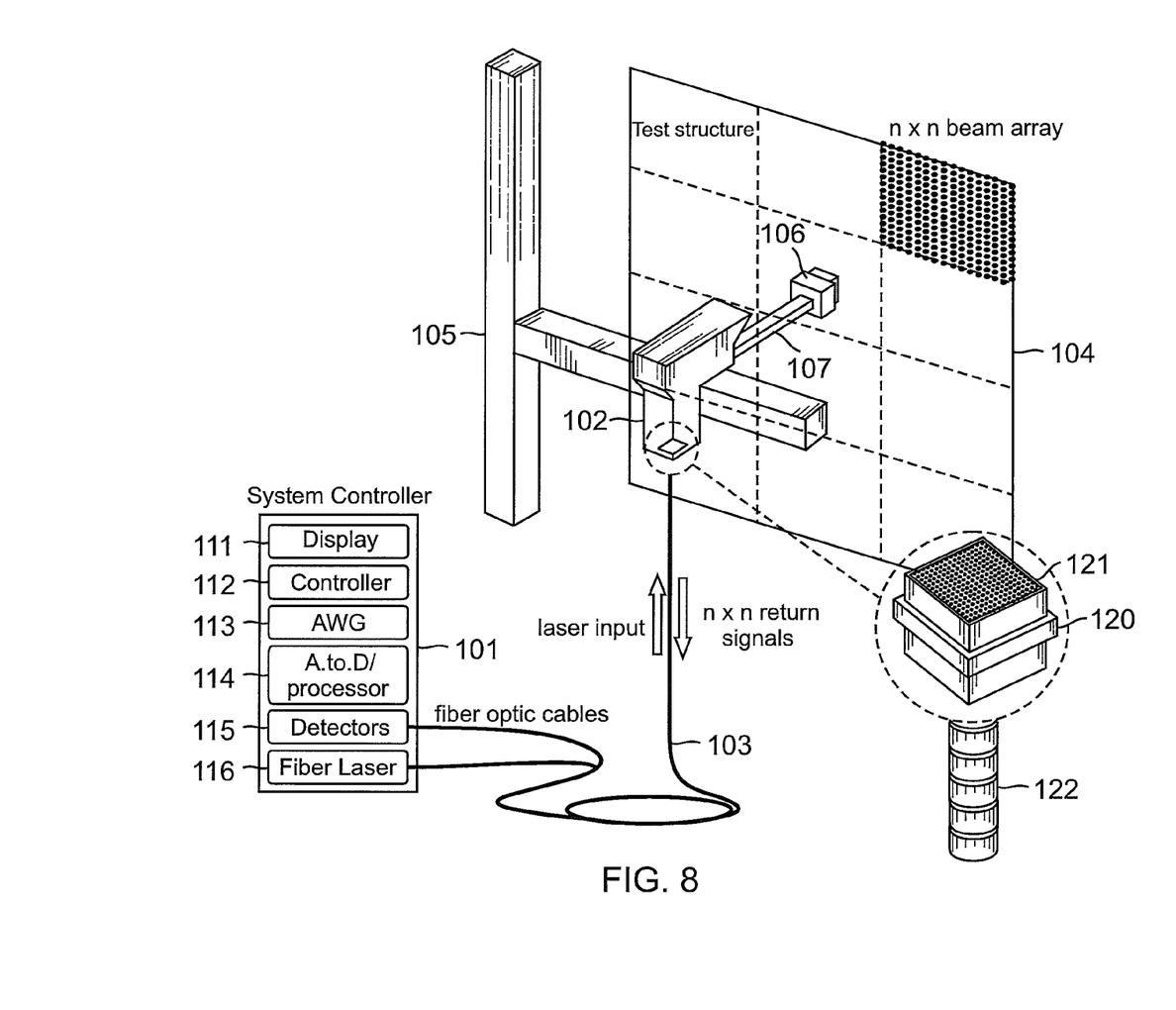
FIG. 8 is a semi-schematic perspective view of a fiber-optic heterodyne imaging vibrometer having a scanning system to facilitate use in multiframe measurement or inspection and also having an acoustic probe for exciting the test surface, according to an exemplary embodiment of the present invention.

Referring now to FIG. 8, a scanning system, such as motorized XY rail 105 is added to the vibrometer system of FIG. 1. The motorized XY rail 105 facilitates easier and more precise positioning of the prove 102 between successive inspections or measurements.

An acoustic probe 106 is also provided. The acoustic probe 106 can be positioned proximate the test surface so as to excite the test surface in order to facilitate characterization thereof with the vibrometer system. The acoustic probe is generally not need when the test surface is otherwise excited. For example, when testing a structure on an aircraft with a running engine, the structure is likely to already be vibrating.

Embodiments of the high speed fiber-optic heterodyne imaging vibrometer can simultaneously measure and display surface velocity or vibration at multiple locations on an object. This can be done with the benefits of high signal-to-noise ratio, wide dynamic range, and high accuracy inherent with the use of heterodyne detection. Embodiments of the high speed fiber-optic imaging vibrometer can be capable of high speed surface deformation or vibration imaging under a less restrictive range of conditions as compared to contemporary devices. Embodiments of the high speed fiber-optic heterodyne imaging vibrometer can be sufficiently robust for field use. Embodiments of the high speed fiber-optic heterodyne imaging vibrometer can have a compact remote inspection probe that facilitates rapid manipulation and translation over convoluted or extended surfaces for structural monitoring and NDI applications.

One or more embodiments provide a matrix laser vibrometer that is capable of high speed surface deformation or vibration imaging of remote structures with a high signal-to-noise ratio, wide dynamic range, and high accuracy. Such embodiments can operate under a less restrictive range of conditions such that they are sufficiently robust for field use.

One or more embodiments provide a matrix laser vibrometer having a compact remote inspection probe that facilitates rapid manipulation and translation over convoluted or extended surfaces. The use of such an inspection probe can facilitate structural monitoring and/or use for non-destructive inspection (NDI) applications.

According to one or more embodiments, a fiber-optic matrix laser vibrometer can comprise a fiber-optic probe that is configured for beam generation and collection of the optical signals required by the processor to provide a dynamic two-dimensional velocity image representative of surface movement.

According to one or more embodiments, a method for characterizing the movement of a surface can comprise forming a dynamic image of the surface velocity distribution.

According to one or more embodiments, a probe for use in a matrix laser vibrometer can comprise means for providing a matrix of laser beams that have a common source and means for heterodyning scattered light from the surface with a reference beam from the common source.

According to one or more embodiments, a method for characterizing the movement of a surface can comprise providing a matrix of laser beams that have a common source and heterodyning scattered light from the surface with a reference beam from the common source. The laser beams can be provided by a probe.

The term "real-time" can be defined herein to include the use of parallel multi-channel digital sampling rates (temporal sampling resolution) of at least 4 times the heterodyne carrier frequency imposed by the modulator. As those skilled in the art will appreciate, this definition is based on well-known sampling criterion.

One or more embodiments of the present invention can facilitate vibration imaging. The term "vibration imaging" can be defined herein to include, at a minimum, the use of a sufficient plurality of measurement beams dispersed in two dimensions (so as to provide a desired spatial sampling resolution) to spatially resolve (image) surface displacement, velocity, and/or acceleration profiles in accordance with the minimum sampling criteria discussed above. For example, structural vibration frequencies of practical industrial interest, e.g. 50 Hz-50 kHz, would necessitate the use of an array beam spacing of approximately 5.0 mm such that a two-dimensional matrix array comprising 16×16 discrete beams yields a resolved vibration image area of 75 mm×75 mm.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A multi-beam interferometer comprising an array of discrete illuminating beam sources and an imager for imaging and optically mixing light from the discrete illuminating beam sources with a single flood-illuminated reference beam to obtain a plurality of mixed light interference signals.

2. The multi-beam interferometer as recited in claim 1, comprising a dual-function optic.

3. The multi-beam interferometer as recited in claim 1, comprising a side launched beam combiner.

4. The multi-beam interferometer as recited in claim 1, wherein the mixed light interference signals comprise analog electronic signals representative of interference of the light from the discrete illuminating beam sources and light from the reference beam.

5. The multi-beam interferometer as recited in claim 1, wherein the mixed light interference signals comprise in-phase (I) and quadrature (Q) signals.

6. The multi-beam interferometer as recited in claim 1, wherein the mixed light interference signals are suitable for characterizing vibration of a surface illuminated by the illuminating beam sources.

* * * * *